US012770804B2

(12) United States Patent
Li et al.

(10) Patent No.: US 12,770,804 B2
(45) Date of Patent: Oct. 20, 2026

(54) ON-LOAD TAP-CHANGER

(71) Applicant: WEST JOURNEY CORPORATION, Xi'an (CN)

(72) Inventors: Xiaoping Li, Xi'an (CN); Yun Wang, Xi'an (CN)

(73) Assignee: WEST JOURNEY CORPORATION, Xi'an (CN)

( * ) Notice: Subject to any disclaimer, the term of this patent is extended or adjusted under 35 U.S.C. 154(b) by 281 days.

(21) Appl. No.: 18/813,032

(22) Filed: Aug. 23, 2024

(65) Prior Publication Data

US 2025/0391617 A1 Dec. 25, 2025

Related U.S. Application Data

(63) Continuation of application No. PCT/CN2024/106453, filed on Jul. 19, 2024.

(30) Foreign Application Priority Data

Jun. 19, 2024 (CN) ......................... 202410794763.1

(51) Int. Cl.
*H01H 9/00* (2006.01)

(52) U.S. Cl.
CPC ........ *H01H 9/0016* (2013.01); *H01H 9/0011* (2013.01); *H01H 9/0027* (2013.01); *H01H 9/0038* (2013.01)

(58) Field of Classification Search
CPC .. H01H 9/0016; H01H 9/0011; H01H 9/0027; H01H 9/0038; H01H 9/00; H01H 9/0044; H01H 33/66; H01H 33/666; H01H 2033/6667; H01H 1/50; H01H 3/42; H01H 2205/002; H01H 2033/6623; H01F 29/04
See application file for complete search history.

(56) References Cited

U.S. PATENT DOCUMENTS

| | | | | | |
|---|---|---|---|---|---|
| 6,008,456 | A * | 12/1999 | Pillmeier | H01H 9/0027 200/11 TC |
| 2016/0181025 | A1* | 6/2016 | Hoepfl | H01H 9/0038 200/11 TC |
| 2018/0122591 | A1* | 5/2018 | Larrieta Zubia | H01H 9/0044 |
| 2020/0168420 | A1* | 5/2020 | Schmidt | H01H 50/54 |

* cited by examiner

*Primary Examiner* — Ahmed M Saeed

(57) ABSTRACT

An on-load tap-changer includes: a tap-changer body and a driving mechanism fixed on the tap-changer body. The tap-changer body includes a housing, multiple insulation fixing plates, multiple turntables, each of which includes a sheave and a cam plate, the cam plate of which is rotatably connected to the insulation fixing plate, and the sheave of which is connected to the driving mechanism, multiple vacuum tubes fixed on the multiple insulation fixing plates, and multiple transmission mechanisms, each of which includes a lifting lever and a reverse spring. When the driving mechanism drives the sheave to regulate voltage, the cam plate is synchronously driven to rotate, and then the vacuum tube is driven by the lifting lever and the reverse spring to achieve on/off arc extinction, thereby achieving on-load voltage regulation.

10 Claims, 9 Drawing Sheets

ON-LOAD TAP-CHANGER

TECHNICAL FIELD

The present disclosure relates to the technical field of transformer's voltage regulation, and more particularly to an on-load tap-changer.

BACKGROUND

Most of traditional transformers use an off-circuit voltage regulation method. Before regulating voltage, it is necessary to cut off power supply, and then the power supply can be restored after adjusting the voltage. Due to the fact that the transformers need to be powered off before regulating the voltage, in view of an actual power grid, there will be problems such as low qualification rate and poor stability in the voltage of the power supply, and the transformers and electrical equipment can also be damaged.

With continuous improvement and development in social economy and the power grid, there will be higher demands for quality of the voltage. An on-load transformer is gradually applied in important nodes of a power system, and it can regulate the voltage under continuous power supply, thereby effectively ensuring the quality of the voltage for the power system and users, as well as avoiding increased losses. An on-load tap-changer includes a driving mechanism, multiple insulation plates, and multiple sheaves that are respectively rotatably connected to the multiple insulation plates; a selector system is correspondingly disposed on each sheave and the corresponding insulation plate, and the selector system is in communication with a vacuum tube; the selector system includes fixed contacts and a moving contact; the fixed contacts are fixed around the insulation plate and are connected to corresponding taps in a winding of the on-load transformer; the moving contact is fixed on the sheave and is in communication with an active end of the vacuum tube; and a fixed end of the vacuum tube is in communication with an incoming end of a high-voltage side coil. Specially, a working principle of the on-load transformer is that: the driving mechanism drives the sheave to rotate, causing the moving contact to switch to another fixed contact connected thereto, thereby changing a number of turns of each winding, i.e., a voltage ratio of the transformer. At the same time, the driving mechanism also needs to synchronously drive the active end of the vacuum tube to move back and forth for on/off arc extinction, thereby achieving regulating the voltage of the on-load transformer.

In order to achieve synchronous on/off arc extinction of the vacuum tube and regulating the voltage by rotating the moving contact driven by the sheave, the existing on-load tap-changer not only needs to provide an installation plate on a side of each insulation plate to fix the vacuum tube on the corresponding installation plate, but also needs to provide a complex transmission mechanism between the installation plate and the insulation plate due to that the sheave and the vacuum tube are respectively disposed on the insulation plate and the installation plate. However, adding multiple installation plates and complex transmission mechanisms to the on-load tap-changer can increase a volume of the on-load tap-changer, thereby making it inconvenient to install the on-load tap-changer.

SUMMARY

In view of the above problems, the present disclosure provides an on-load tap-changer to address the shortcomings existed in the related art. The present disclosure can effectively reduce the volume of the on-load tap-changer and improve the convenience of installing the on-load tap-changer.

A technical solution of the present disclosure is as follows. The on-load tap-changer includes: a tap-changer body and a driving mechanism fixed on the tap-changer body; the tap-changer body includes: a housing, multiple insulation fixing plates vertically fixed at a bottom of the housing at equal intervals and arranged in a row, multiple turntables, each of which includes: a sheave and a cam plate that are coaxial and integrated into one whole, the cam plate of which is rotatably connected to a corresponding insulation fixing plate of the multiple insulation fixing plates, and the sheave of which is connected to the driving mechanism that is configured to rotate the sheave, multiple vacuum tubes fixed on the multiple insulation fixing plates correspondingly and each of which is disposed on a side of the corresponding insulation fixing plate where the cam plate is disposed, and multiple transmission mechanisms, each of which includes a lifting lever and a reverse spring. The lifting lever is hinged on the corresponding insulation fixing plate and is disposed between the cam plate and the vacuum tube. An end of the lifting lever is abutted against the cam plate and another end of the lifting lever is connected to an active end of the vacuum tube. The reverse spring is connected between the lifting lever and the housing and is configured to move the active end of the vacuum tube back and forth.

In an embodiment, the tap-changer body further includes multiple selector systems. Each of the multiple selector systems includes a moving contact, multiple fixed contacts, and a moving contact lead post. The moving contact lead post is fixed on the corresponding insulation fixing plate and disposed perpendicular to the corresponding insulation fixing plate. The moving contact lead post is connected with the active end of the vacuum tube through a lead wire, and the turntable is sleeved on the moving contact lead post and rotatably connected to the moving contact lead post. The multiple fixed contacts are disposed around an outer side of the moving contact lead post at equal intervals and are fixedly connected to the corresponding insulation fixing plate. The moving contact is fixed on the turntable, an end of the moving contact is connected to the moving contact lead post, and another end of the moving contact is movably connected to the multiple fixed contacts.

In an embodiment, the moving contact includes a moving contact power guide seat, a pair of moving contact clamping pieces, and a pair of moving contact rotating conductive clamping pieces. The moving contact power guide seat is fixed on the turntable and the turntable defines a through hole along an axial direction of the turntable. The pair of moving contact clamping pieces penetrates through the through hole, is abutted against an inner side and an outer side of a corresponding fixed contact of the multiple fixed contacts, and is connected to an end of the moving contact power guide seat. The pair of moving contact rotating conductive clamping pieces clamped on the moving contact lead post and is connected to another end of the moving contact power guide seat.

In an embodiment, the pair of moving contact clamping pieces and the pair of moving contact rotating conductive clamping pieces are individually hinged with the moving contact power guide seat. Spring shafts are respectively threaded on the pair of moving contact clamping pieces and the pair of moving contact rotating conductive clamping pieces; one of the spring shafts is perpendicular to an articulated shaft disposed on the pair of moving contact clamping pieces, and the other of the spring shafts is perpendicular to an articulated shaft disposed on the pair of moving contact rotating conductive clamping pieces. The one spring shaft is slidably connected to the pair of moving contact clamping pieces along an axial direction of the one spring shaft, and the other spring shaft is slidably connected to the pair of moving contact rotating conductive clamping pieces along an axial direction of the other spring shaft. Limit springs are respectively connected between two ends of the one spring shaft and the pair of moving contact clamping pieces as well as two ends of the other spring shaft and the pair of moving contact rotating conductive clamping pieces.

In an embodiment, each of the multiple selector systems further includes: a transition resistor mechanism. The transition resistor mechanism includes a transition resistor winding plate and a transition resistance wound and fixed along a length direction of the transition resistor winding plate. Two ends of the transition resistance are respectively connected to the moving contact lead post and the active end of the vacuum tube through lead wires.

In an embodiment, a guide block is disposed below the active end of the vacuum tube and is fixedly connected to the corresponding insulation fixing plate. The active end of the vacuum tube is fixedly provided with a lifting shaft of the vacuum tube, which penetrates through the guide block and is slidably connected to the guide block along an axial direction of the lifting shaft of the vacuum tube. An end of the lifting lever facing away from the cam plate is connected to the lifting shaft of the vacuum tube.

In an embodiment, the lifting lever includes an active lever and a follower lever that are integrated into one whole. An end of the active lever is connected to an end of the follower lever. A connection between the active lever and the follower lever is provided with a connecting shaft and the active lever and the follower lever are rotatably connected to the connecting shaft. The connecting shaft is vertically fixed on the corresponding insulation fixing plate. Another end of the active lever is abutted against the cam plate. Another end of the follower lever defines a U-shaped groove, and the active end of the vacuum tube is embedded in the U-shaped groove. A limited protrusion is fixed between the active end of the vacuum tube and the lifting shaft of the vacuum tube and the limited protrusion is abutted against the U-shaped groove.

In an embodiment, another end of the active lever facing away from the follower lever and another end of the follower lever facing away from the active lever are respectively provided with installation grooves. The installation grooves disposed on the follower lever are located on two sides of the U-shaped groove; and the installation grooves are rotatably provided with rollers respectively, and rotation shafts of the rollers are parallel to the connecting shaft; and the rollers are abutted against the cam plate and the limited protrusion respectively.

In an embodiment, the tap-changer body further includes a driver system. The driver system includes a driving wheel shaft, multiple driving cams, and multiple levers. The driving wheel shaft penetrates through the multiple insulation fixing plates and is rotatably connected to the multiple insulation fixing plates. An axis of the driving wheel shaft is parallel to axes of the multiple turntables, and the driving wheel shaft is connected to an output end of the driving mechanism. The multiple driving cams are sleeved on the driving wheel shaft; the multiple levers are respectively fixed on ends of the multiple driving cams facing away from the driving wheel shaft. The multiple levers are parallel to the driving wheel shaft and are movably connected to the multiple sheaves disposed on the multiple turntables.

In an embodiment, two of the multiple driving cams are disposed on two sides of each of the multiple insulation fixing plates respectively, and an angle between the two driving cams on the two sides of the insulation fixing plate is 140 degrees (°). The two sides of the insulation fixing plate are symmetrically equipped with two of the multiple turntables respectively, and the multiple fixed contacts pass through the corresponding insulation fixing plate. Ends of two adjacent fixed contacts of the multiple fixed contacts are configured to be alternately connected with a tap in a winding of an on-load transformer through lead wires.

Compared with the related art, the present disclosure provides the on-load tap-changer, which utilizes the driving mechanism to cooperate with the multiple insulation fixing plates as well as the multiple sheaves and the multiple cam plates disposed on the multiple turntables inside the housing of the tap-changer body. When the driving mechanism drives the multiple sheaves to rotate for regulating the voltage, the multiple cam plates are synchronously driven to rotate. Then, the lifting lever and the reverse spring of the transmission mechanism are used to drive the active end of the vacuum tube to move back and forth to achieve the on/off arc extinction, thereby achieving regulating the voltage of the on-load transformer. The vacuum tube, the transmission mechanism, and the selector system are located on the same insulation fixing plate, avoiding adding multiple installation plates additionally. At the same time, the lifting lever and the reverse spring are used to drive the vacuum tube to move, which can greatly reduce the number of components used in the transmission mechanism of the on-load tap-changer. Therefore, the volume of the on-load tap-changer is effectively reduced and the convenience of installing the on-load tap-changer is improved.

DETAILED DESCRIPTION OF EMBODIMENTS

Figure 1:
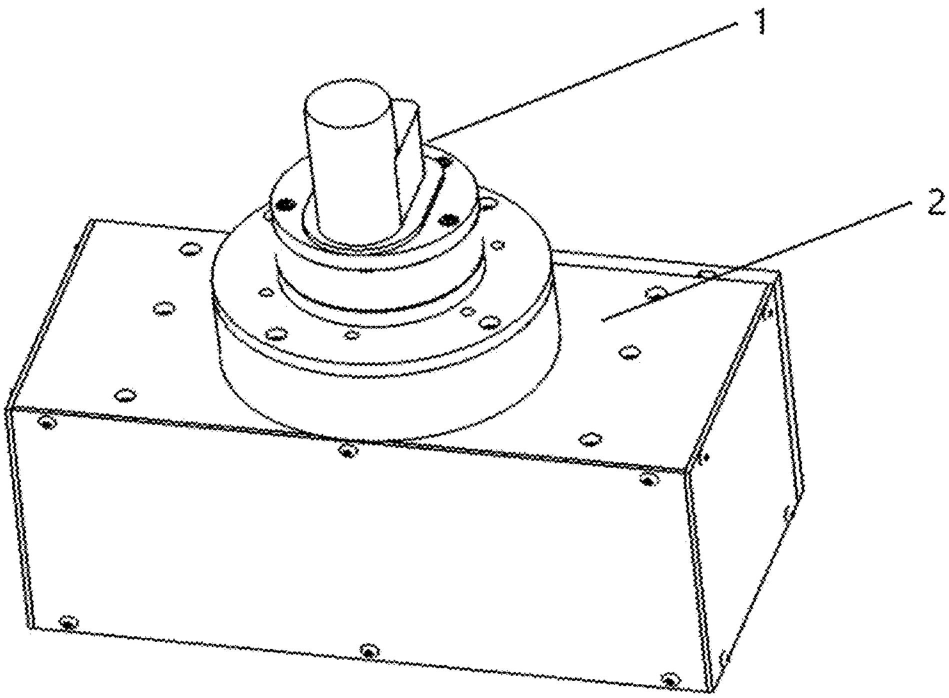
FIG. 1 illustrates a schematic three-dimensional diagram of an on-load tap-changer according to the present disclosure.

The present disclosure provides an on-load tap-changer. The present disclosure is explained by the following description in conjunction with the schematic structural diagrams illustrated in FIGS. 1-13.

In the description of the present disclosure, it should be understood that terms, such as "center", "longitudinal", "transverse", "length", "width", "thickness", "up", "down", "front", "rear", "left", "right", "vertical", "horizontal", "top", "bottom", "inner", "outer", "axial", "radial", "circumferential", etc., indicating that an orientation or position relationship based on the orientation or position relationship shown in the attached drawings are only for convenience of describing the technical solution and simplifying the description of the present disclosure, and not to indicate or imply that the device or component referred to must have a specific orientation, or be constructed or operated in a specific manner. Therefore, these terms cannot be understood as limitations to the present disclosure.

Most of traditional transformers use an off-circuit voltage regulation method. Before regulating voltage, it is necessary to cut off power supply, and then the power supply can be restored after adjusting the voltage. Due to the fact that the transformers need to be powered off before regulating the voltage, in view of an actual power grid, there will be problems such as low qualification rate and poor stability in the voltage of the power supply, and the transformers and electrical equipment can also be damaged.

With continuous improvement and development in social economy and the power grid, there will be higher demands for quality of the voltage. An on-load transformer is gradually applied in important nodes of a power system, and it can regulate the voltage under continuous power supply, thereby effectively ensuring the quality of the voltage for the power system and users, as well as avoiding increased losses. An on-load tap-changer includes a driving mechanism, multiple insulation plates, and multiple sheaves that are respectively rotatably connected to the multiple insulation plates; a selector system is correspondingly disposed on each sheave and the corresponding insulation plate, and the selector system is in communication with a vacuum tube; the selector system includes fixed contacts and a moving contact; the fixed contacts are fixed around the insulation plate and are connected to corresponding taps in a winding of the on-load transformer; the moving contact is fixed on the sheave and is in communication with an active end of the vacuum tube; and a fixed end of the vacuum tube is in communication with an incoming end of a high-voltage side coil. Specially, a working principle of the on-load transformer is that: the driving mechanism drives the sheave to rotate, causing the moving contact to switch to another fixed contact connected thereto, thereby changing a number of turns of each winding, i.e., a voltage ratio of the transformer. At the same time, the driving mechanism also needs to synchronously drive the active end of the vacuum tube to move back and forth for on/off arc extinction, thereby achieving regulating the voltage of the on-load transformer.

In order to achieve synchronous on/off arc extinction of the vacuum tube and regulating the voltage by rotating the moving contact driven by the sheave, the existing on-load tap-changer not only needs to provide an installation plate on a side of each insulation plate to fix the vacuum tube on the corresponding installation plate, but also needs to provide a complex transmission mechanism between the installation plate and the insulation plate due to that the sheave and the vacuum tube are respectively disposed on the insulation plate and the installation plate. However, adding multiple installation plates and complex transmission mechanisms to the on-load tap-changer can increase a volume of the on-load tap-changer, thereby making it inconvenient to install the on-load tap-changer.

Based on the above problems, an embodiment of the present disclosure provides an on-load tap-changer. Specially, the on-load tap-changer utilize a driving mechanism to cooperate with multiple insulation fixing plates as well as multiple sheaves and multiple cam plates disposed on multiple turntables inside a housing of a tap-changer body of the on-load tap-changer. When the driving mechanism drives the multiple sheaves to rotate for regulating the voltage, the multiple cam plates are synchronously driven to rotate. Then, the lifting lever and the reverse spring of the transmission mechanism are used to drive the active end of the vacuum tube to move back and forth to achieve the on/off arc extinction, thereby achieving regulating the voltage of the on-load transformer. The vacuum tube, the transmission mechanism, and the selector system are located on the same insulation fixing plate, avoiding adding multiple installation plates additionally. At the same time, the lifting lever and the reverse spring are used to drive the vacuum tube to move, which can greatly reduce the number of components used in the transmission mechanism of the on-load tap-changer. Therefore, the volume of the on-load tap-changer is effectively reduced and the convenience of installing the on-load tap-changer is improved. The on-load tap-changer of the present disclosure has a compact structure, reasonable arrangement, high service life, strong practicality, and is worthy of promotion.

Figure 2:
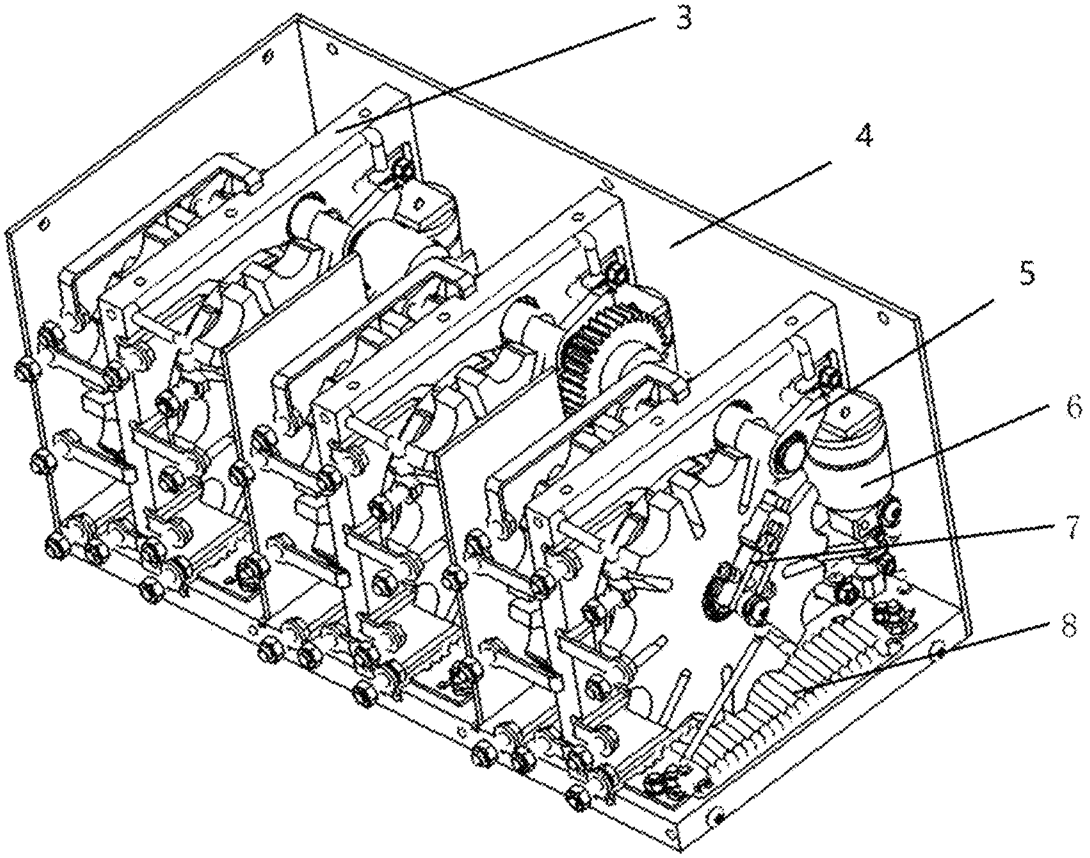
FIG. 2 illustrates a schematic three-dimensional diagram of a tap-changer body according to the present disclosure.

As shown in FIG. 1, a three-dimensional diagram of the on-load tap-changer in the present embodiment is provided. Specially, the on-load tap-changer includes a tap-changer body 2 and a driving mechanism 1 fixed on the tap-changer body 2. FIG. 2 illustrates a three-dimensional diagram of the tap-changer body in the present embodiment. Specially, the tap-changer body 2 includes: a housing 4, multiple insulation fixing plates 3 vertically fixed at a bottom of the housing 4 at equal intervals and arranged in a row, multiple turntables 32, each of which includes: a sheave 45 and a cam plate 44 that are coaxial and integrated into one whole. Moreover, the cam plate 44 is rotatably connected to the corresponding insulation fixing plate 3 and the sheave 45 is connected to the driving mechanism 1 that is configured to rotate the sheave 45. In addition, the tap-changer body 2 further includes: multiple vacuum tubes 6 fixed on the multiple insulation fixing plates 3 correspondingly. And the multiple vacuum tubes 6 are disposed on sides of the multiple insulation fixing plates 3 where the multiple cam plates 44 are disposed. In addition, the tap-changer body 2 further includes: multiple transmission mechanisms, each of which includes a lifting lever 36 and a reverse spring 37. The lifting lever 36 is hinged on the corresponding insulation fixing plate 3 and is disposed between the cam plate 44 and the corresponding vacuum tube 6, an end of the lifting lever 36 is abutted against the cam plate 44, and another end of the lifting lever 36 is connected to an active end 61 of the corresponding vacuum tube 6. The reverse spring 37 is connected between the lifting lever 36 and the housing 4 and is configured to move the active end 61 of the vacuum tube 6 back and forth.

Due to that the vacuum tube is placed on a side of the selector system, the existing on-load tap-changer has complex lead wires among the vacuum tube and the moving contact of the selector system, as well as the incoming end of the high-voltage side coil, which increases the manufacturing cost of the on-load transformer and is not conducive to the insulation performance of the on-load transformer.

Figure 3:
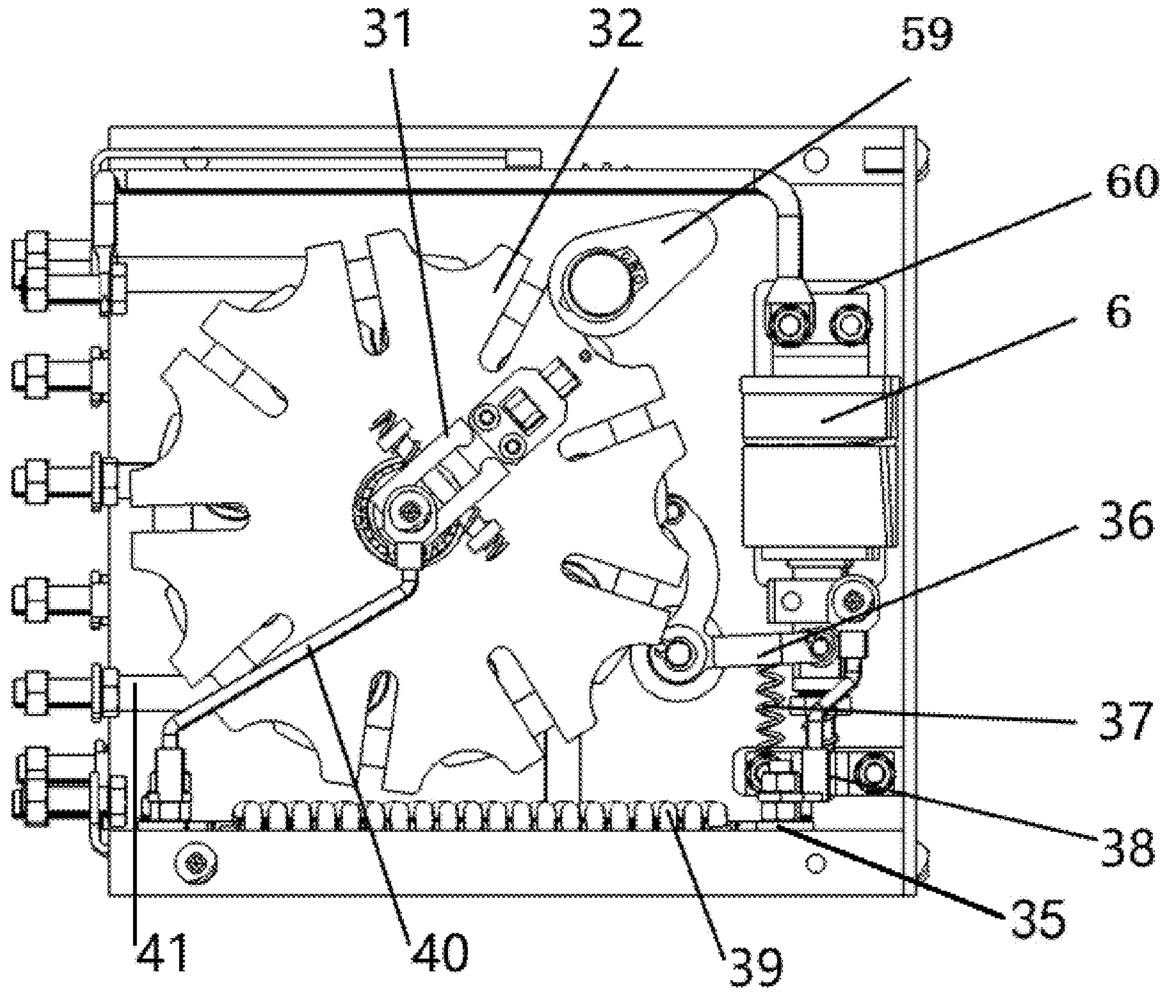
FIG. 3 illustrates a schematic three-dimensional diagram of a selector system according to the present disclosure.

Therefore, the present embodiment proposes a technical solution. FIG. 3 illustrates a three-dimensional diagram of the selector system according to the present embodiment. In an illustrated embodiment, the tap-changer body 2 further includes: multiple selector systems 7, each of which includes a moving contact 31, multiple fixed contacts 42, and a moving contact lead post 43. The moving contact lead post 43 is fixed on the corresponding insulation fixing plate 3 and disposed perpendicular to the corresponding insulation fixing plate 3. The moving contact lead post 43 is connected with the active end 61 of the corresponding vacuum tube 6 through a lead wire. The corresponding turntable 32 is sleeved on the moving contact lead post 43 and rotatably connected to the moving contact lead post 43. The multiple fixed contacts 42 are disposed around an outer side of the moving contact lead post 43 at equal intervals and are fixedly connected to the corresponding insulation fixing plate 3. The moving contact 31 is fixed on the corresponding turntable 32, an end of the moving contact 31 is connected to the moving contact lead post 43, and the other end of the moving contact 31 is movably connected to the multiple fixed contacts 42.

In the present embodiment, the multiple selector systems 7 form a three-phase selector system, each selector system 7 is a single-phase selector system, and the multiple selector systems 7 are evenly distributed in the housing 4. There are nine fixed contacts 42 in the selector system 7 (i.e., the single-phase selector system), and each fixed contact leads out a hard wire 41. An end of each hard wire 41 is fixed with a binding post formed by a copper bolt matched with a copper nut. The binding post is connected to the tap in the corresponding winding of the on-load transformer through the lead wire, and the moving contact 31 switches to contact with different fixed contacts 42 when the corresponding turntable 32 rotates, thereby regulating the voltage of the on-load transformer.

In the present embodiment, a fixed end 60 of the vacuum tube 6 is connected to the incoming end of the high-voltage side coil through a lead wire, thereby achieving a reasonable arrangement of the lead wires at the vacuum tube, the moving contact, and the incoming end of the high-voltage side coil and facilitating the installation and long-term stable operation of the on-load tap-changer.

Specially, the moving contact lead post 43 in the present embodiment is fixed on the corresponding insulation fixing plate 3 by a half-round-head screw.

Moreover, the fixed end 60 of the vacuum tube 6 is fixed on the corresponding insulation fixing plate 3 by bolts, and a hard wire is led out through another bolt. An end of the hard wire is fixed with a binding post formed by a copper bolt matched with a copper nut, the binding post is used as a common terminal, and the common terminal is connected with the incoming end of the high-voltage side coil.

Figure 4:
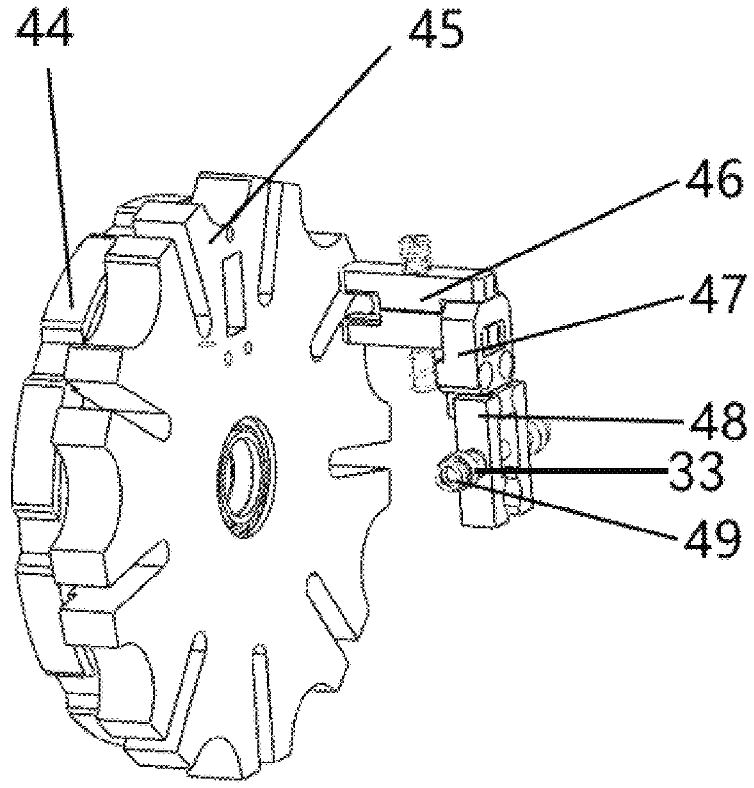
FIG. 4 illustrates a schematic three-dimensional assembly diagram of a turntable and a moving contact according to the present disclosure.

In an illustrated embodiment, FIG. 4 is a three-dimensional diagram of an assembly of the turntable and the moving contact. Specially, the moving contact 31 includes a moving contact power guide seat 47, a pair of moving contact clamping pieces 46, and a pair of moving contact rotating conductive clamping pieces 48. The moving contact power guide seat 47 is fixed on the corresponding turntable 32, and the turntable 32 defines a through hole along an axial direction of the turntable 32. The pair of moving contact clamping pieces 46 penetrates through the through hole. The pair of moving contact clamping pieces 46 is abutted against an inner side and an outer side of the corresponding fixed contact 42. The pair of moving contact clamping pieces 46 is connected to an end of the moving contact power guide seat 47. The pair of moving contact rotating conductive clamping pieces 48 is clamped on the moving contact lead post 43, and the pair of moving contact rotating conductive clamping pieces 48 is connected to the other end of the moving contact power guide seat 47.

In the present embodiment, the disclosure uses the moving contact power guide seat 47, the pair of moving contact clamping pieces 46, and the pair of moving contact rotating conductive clamping pieces 48 to realize the stability of the communication between the moving contact 31 and the multiple fixed contacts 42, as well as the moving contact lead post 43 during regulating the voltage of the on-load transformer.

In an illustrated embodiment, the pair of moving contact clamping pieces 46 and the pair of moving contact rotating conductive clamping pieces 48 are respectively hinged with the moving contact power guide seat 47. The pair of moving contact clamping pieces 46 and the pair of moving contact rotating conductive clamping pieces 48 are equipped with spring shafts 49. One of the spring shafts 49 is perpendicular to an articulated shaft disposed on the pair of moving contact clamping pieces 46, and the other of the spring shafts 49 is perpendicular to an articulated shaft disposed on the pair of moving contact rotating conductive clamping pieces 48. In addition, the one spring shaft 49 is slidably connected to the pair of moving contact clamping pieces 46 along an axial direction of the one spring shaft 49, and the other spring shaft 49 is slidably connected to the pair of moving contact rotating conductive clamping pieces 48 along an axial direction of the other spring shaft 49. Limit springs 33 are respectively connected between two ends of the one spring shaft 49 and the pair of moving contact clamping pieces 46 as well as two ends of the other spring shaft 49 and the pair of moving contact rotating conductive clamping pieces 48.

In the present embodiment, a number of the pair of moving contact clamping pieces 46 is two, i.e., an upper one and a lower one. The upper one and the lower one of the pair of moving contact clamping pieces 46 penetrate the through hole (i.e., a square hole) defined on the turntable 32; and a number of the pair of moving contact rotating conductive clamping pieces 48 is two, i.e., a left one and a right one. The spring shafts 49 and the limit springs 33 disposed on the spring shafts 49 can limit the pair of moving contact rotating conductive clamping pieces 48 and the pair of moving contact clamping pieces 46 from separating.

In the existing on-load tap-changer, a transition resistance needs to be connected between the active end 61 of the vacuum tube 6 and the moving contact 31. However, the lead wires among the connection and a fixing method of the transition resistance are complex.

Therefore, the present embodiment proposes a technical solution. In an illustrated embodiment, each of the multiple selector systems 7 further includes a transition resistor mechanism 8. Specially, the transition resistor mechanism 8 includes a transition resistor winding plate 35 and a transition resistance 39 wound and fixed along a length direction of the transition resistor winding plate 35. Two ends of the transition resistance 39 are respectively connected to the moving contact lead post 43 and the active end 61 of the corresponding vacuum tube 6 through lead wires.

In the present embodiment, the transition resistor winding plate 35 is fixed on a bottom of the housing 4 through bolts. Two ends of the transition resistor winding plate 35 are fixed with wiring terminals through the bolts. The left wiring terminal is connected to the moving contact lead post 43 through a flexible wire 40, while the right wiring terminal is connected to the active end 61 of the vacuum tube 6 through a flexible wire.

Figure 6:
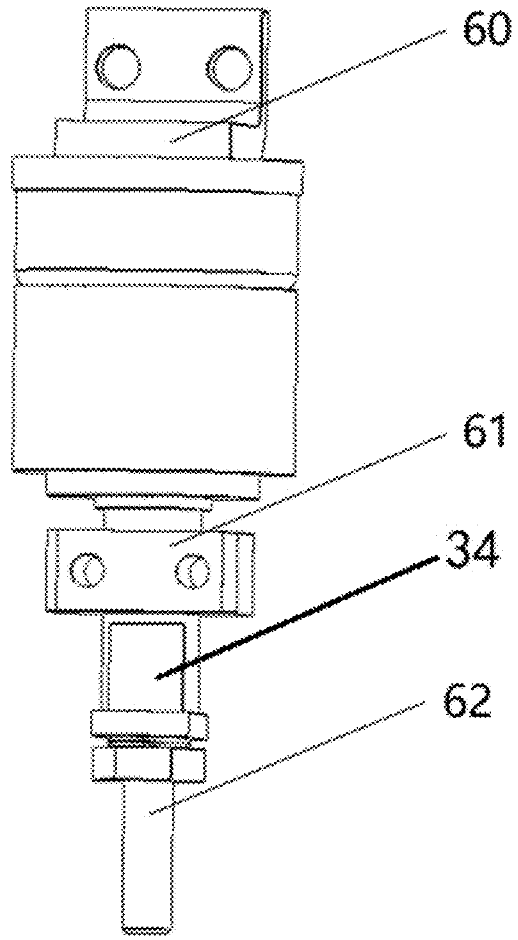
FIG. 6 illustrates a schematic diagram of a vacuum tube according to the present disclosure.

In an illustrated embodiment, FIG. 6 is a schematic diagram of the vacuum tube in the present embodiment. Specially, a guide block 38 is disposed directly below the active end 61 of the vacuum tube 6 and is fixedly connected to the corresponding insulation fixing plate 3. The active end 61 of the vacuum tube 6 is fixedly provided with a lifting shaft 62 of the vacuum tube 6. The lifting shaft 62 of the vacuum tube 6 penetrates through the guide block 38 and is slidably connected to the guide block 38 along an axial direction of the lifting shaft 62 of the vacuum tube 6. An end of the lifting lever 36 facing away from the cam plate 44 is connected to the lifting shaft 62 of the vacuum tube 6.

In the present embodiment, the disclosure utilizes the guide block 38 and the lifting shaft 62 of the vacuum tube 6 to improve the stability of the active end 61 of the vacuum tube 6 driven up and down by the lifting lever 36 and the reverse spring 37. Moreover, the stability of regulating the voltage of the on-load tap-changer is improved. In addition, an end of the reverse spring 37 facing away from the lifting lever 36 is connected to the guide block 38.

Figure 8:
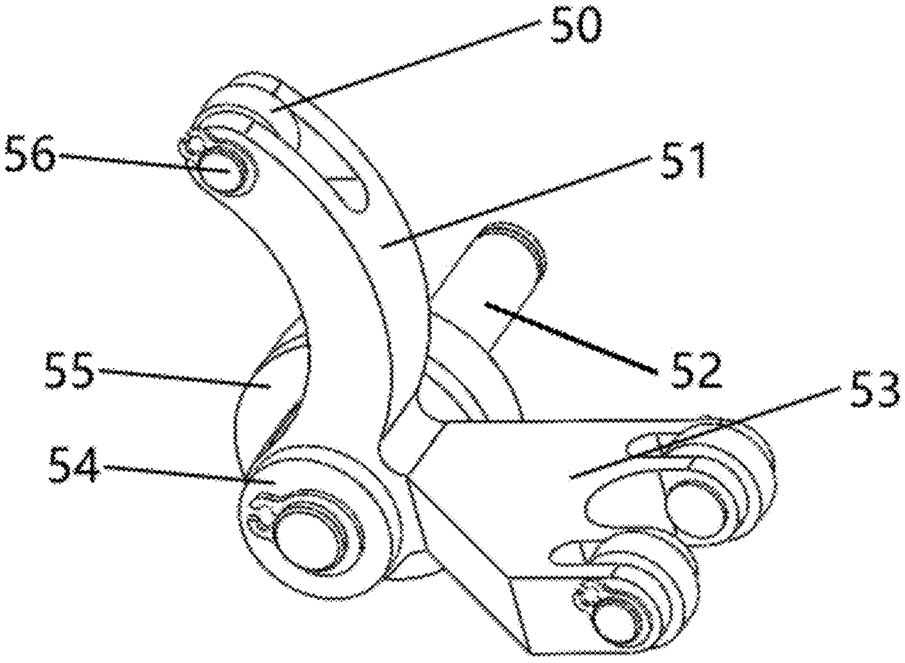
FIG. 8 illustrates a schematic three-dimensional diagram of a lifting lever according to the present disclosure.

In an illustrated embodiment, FIG. 8 is a three-dimensional diagram of the lifting lever of the present embodiment. Specially, the lifting lever 36 includes: an active lever 51 and a follower lever 53 that are integrated into one whole. An end of the active lever 51 and an end of the follower lever 53 are connected to each other. A connection between the active lever 51 and the follower lever 53 is provided with a connecting shaft 52, and the active lever 51 and the follower lever 53 are rotatably connected to the connecting shaft 52. The connecting shaft 52 is vertically fixed on the corresponding insulation fixing plate 3. Moreover, the other end of the active lever 51 is abutted against the cam plate 44; and the other end of the follower lever 53 defines a U-shaped groove, and the active end 61 of the vacuum tube 6 is embedded in the U-shaped groove. In addition, a limited protrusion 34 is fixed between the active end 61 of the vacuum tube 6 and the lifting shaft 62 of the vacuum tube 6, and the limited protrusion 34 is abutted against the U-shaped groove.

In the present embodiment, the lifting lever 36 composed of the active lever 51 and the follower lever 53 that are integrated into one whole cooperates with the cam plate 44; moreover, the U-shaped groove defined on the follower lever 53 can match with the limited protrusion 34 formed between the active end 61 and the lifting shaft 62 of the vacuum tube 6, ensuring that the turntable 32 uses the lifting lever 36 to drive the active end 61 of the vacuum tube 6 to move.

The lifting lever 36 in the present embodiment further includes a ring 54 and an insulation sleeve 55. The connection between the active lever 51 and the follower lever 53 is sleeved on the connecting shaft 52, and the lifting lever 36 is fixed by using the ring 54. The insulation sleeve 55 is sleeved on the connecting shaft 52 and is disposed between the lifting lever 36 and the insulation fixing plate 3.

In an illustrated embodiment, another end of the active lever 51 facing away from the follower lever 53 and another end of the follower lever 53 facing away from the active lever 51 are respectively provided with installation grooves. The installation grooves disposed on the follower lever 53 are located on two sides of the U-shaped groove. In addition, the installation grooves on the active lever 51 and the follower lever 53 are rotatably provided with rollers 50 respectively. Rotation shafts of the rollers 50 are parallel to the connecting shaft 52, and the rollers 50 are abutted against the cam plate 44 and the limited protrusion 34 respectively.

In the present embodiment, the lifting lever 36 further includes multiple roller shafts 56. Specially, the roller shafts 56 are threaded on the rollers 50 correspondingly and rotatably connected to the rollers 50. Two ends of the roller shaft 56 in the follower lever 53 are fixedly connected to an inner wall of the U-shaped groove. In addition, the rollers 50 are used to prevent the active lever 51 and the follower lever 53 from getting stuck with the cam plate 44 and the limited protrusion 34.

Figure 7:
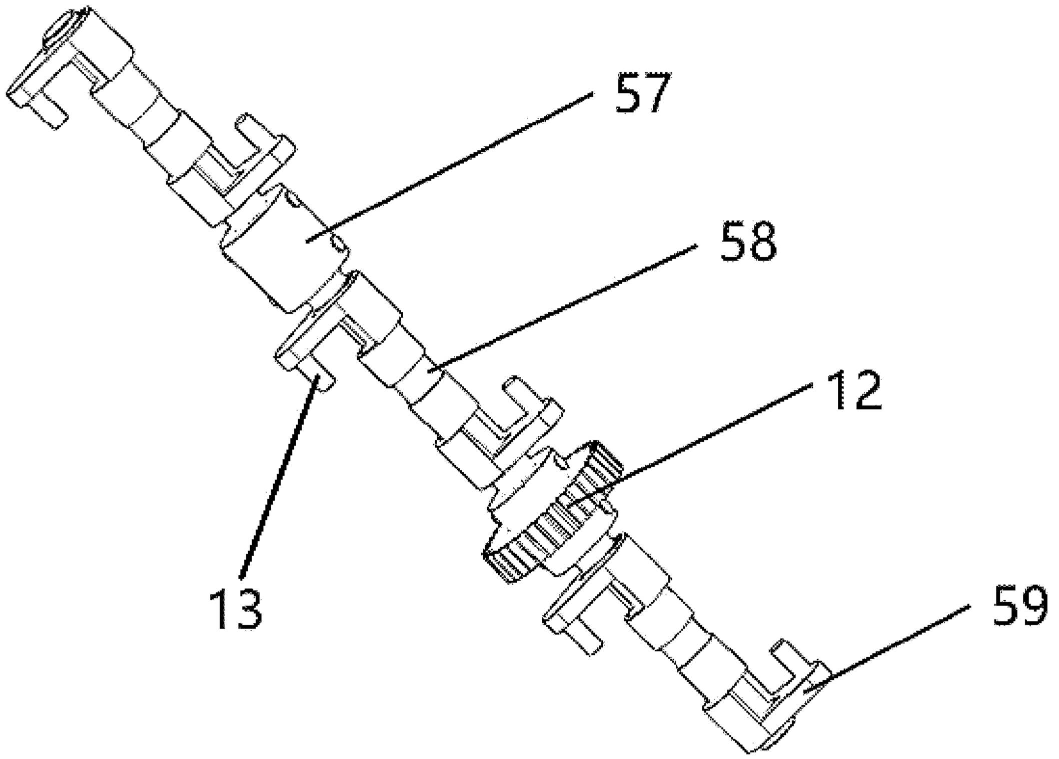
FIG. 7 illustrates a schematic three-dimensional diagram of a driver system according to the present disclosure.

FIG. 7 is a three-dimensional diagram of a driver system in the present embodiment. In an illustrated embodiment, the tap-changer body 2 further includes a driver system 5. The driver system 5 includes: a driving wheel shaft 58, multiple driving cams 59, and multiple levers 13. The driving wheel shaft 58 penetrates through the multiple insulation fixing plates 3 and is rotatably connected to the multiple insulation fixing plates 3. An axis of the driving wheel shaft 58 is parallel to axes of the multiple turntables 32, and the driving wheel shaft 58 is connected to the output end of the driving mechanism 1. The multiple driving cams 59 are sleeved on the driving wheel shaft 58, and the multiple levers 13 are fixed on ends of the multiple driving cams 59 facing away from the driving wheel shaft 58 correspondingly. The multiple levers 13 are parallel to the driving wheel shaft 58, and the multiple levers 13 are movably connected to the multiple sheaves 45 on the multiple turntables 32.

In the present embodiment, the driving wheel shaft 58 is composed of three shaft bodies, each of which extends through the corresponding insulation fixing plate 3 and can be rotatably supported on the corresponding insulation fixing plate 3. A coupling 57 is set between the shaft bodies to ensure the simultaneous operation of the three shaft bodies. The lever 13 of the driving cam 59 matches a locking arc disposed on a side of the sheave 45 on the turntable 32. As the turntable 32 rotates, the lever 13 of the driving cam 59 matches a U-shaped groove defined on the sheave 45; the lever 13 engages in the corresponding U-shaped groove defined on the sheave 45 to drive the sheave 45 to rotate. The cam plate 44 rotates a circle while the sheave 45 only rotates a small angle. During the rotation of the sheave 45, the cam plate 44 disposed below the sheave pushes the lifting lever 36 to swing, thereby causing the vacuum tube 6 to operate.

Figure 5:
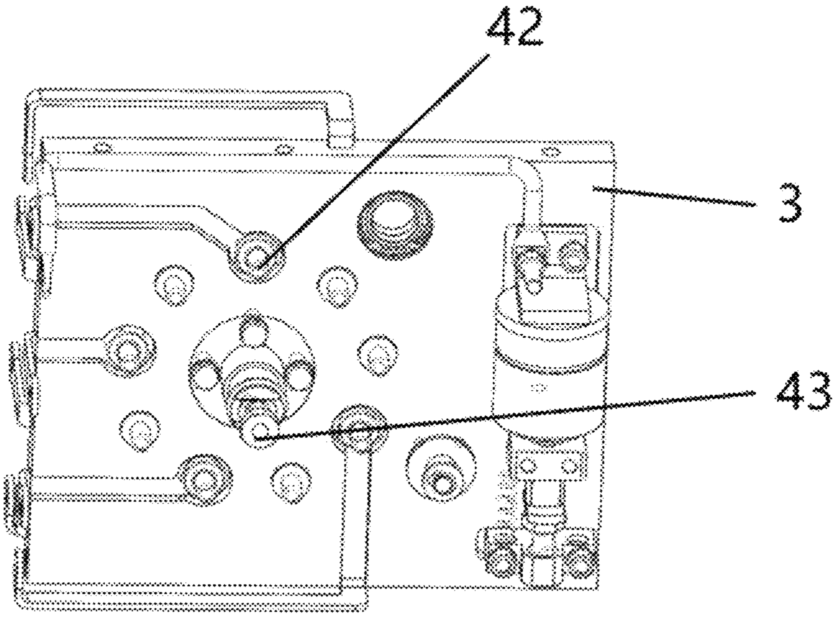
FIG. 5 illustrates a schematic three-dimensional assembly diagram of an insulation fixing plate and multiple fixed contacts according to the present disclosure.

In an illustrated embodiment, two of the multiple driving cams 59 are distributed on two sides of the corresponding insulation fixing plate 3, and an angle between the two driving cams 59 disposed on the two sides of the corresponding insulation fixing plate 3 is 140 degrees (°). The two sides of the corresponding insulation fixing plate 3 are symmetrically equipped with two turntables 32. FIG. 5 is a three-dimensional diagram of an assembly between the corresponding insulation fixing plate and the multiple fixed contacts in the present embodiment. The multiple fixed contacts 42 are threaded on the corresponding insulation fixing plate 3, and ends of two adjacent fixed contacts 42 are alternately connected to the tap in the winding of the on-load transformer through lead wires.

In the present embodiment, there are nine fixed contacts 42 distributed on the corresponding insulation fixing plate 3; and the nine fixed contacts 42 extend from a side of the corresponding insulation fixing plate 3 to the other side of the corresponding insulation fixing plate 3. The two turntables 32 disposed on the two sides of the corresponding insulation fixing plate 3 are respectively provided with the moving contact 31. The moving contact 31 can selectively connect to the multiple fixed contacts 42. Each fixed contact 42 is connected to a lead wire, and the moving contacts 31 disposed on the two sides of the corresponding insulation fixing plate 3 rotate around a same fixed axis under the support of two corresponding sheaves 45. Pins of multiple hard wires 41 are installed on the same side of the corresponding insulation fixing plate 3, making the layout of the lead wires more reasonable and the operation of the on-load tap-changer more convenient.

In the present embodiment, the two moving contacts 31 and the two turntables 32 in each shaft body are fixed on the two sides of the corresponding insulation fixing plate 3. However, the two moving contacts 31 and the two turntables do not interfere with each other during movement, resulting in better switch reliability of the on-load tap-changer. At the same time, the two driving cams 59 on the two sides of the corresponding insulation fixing plate 3 are installed with a specific angle; the levers 13 drives the corresponding turntables 32 (i.e., the sheaves 45) on the two sides of the corresponding insulation fixing plate 3 to rotate sequentially, which can simultaneously complete a gear switch after the corresponding driving cams 59 rotate once. Therefore, switching efficiency of the on-load tap-changer is higher, and the operation of the on-load tap-changer is more stable.

The three-phase selector system in the present embodiment is arranged in a strip shape, which makes the layout of the on-load tap-changer more compact, improves space utilization of the on-load tap-changer, and can adapt to a variety of transformers with different voltage distribution.

The multiple vacuum tubes 6 are longitudinally arranged on the two sides of the multiple insulation fixing plates 3, which has a larger action space and more reasonable arrangement and is also convenient for setting the transition resistance. At the same time, the reverse spring 37 is set between the lifting lever 36 and the guide block 38 to ensure the stability of the vacuum tube 6 during its opening and closing, and to increase the service life of the vacuum tube 6.

The on-load tap-changer in the present embodiment is driven by a drive motor 9 to rotate a transmission gear 12 set in a power transmission mechanism 11, further driving the turntable 32 to rotate and drive the moving contact 31 to rotate to the adjacent fixed contact 42, thus completing a gear switch. During the switching process of the on-load tap-changer, the three-phase selector system will synchronize the switching action, so that the on-load tap-changer can maintain the consistency of the three-phase action.

The single-phase selector system is equipped with two vacuum tubes 6 that act sequentially during the switching process, playing a role in vacuum arc extinction. The on-load tap-changer with the two vacuum tubes in the single-phase selector system has a higher switching efficiency and smoother gear switch compared to the on-load tap-changer with a single vacuum tube.

The present embodiment achieves miniaturization of the on-load tap-changer during the voltage distribution, while also having advantages such as high switching efficiency, good reliability, multiple gear positions, long service life, and suitability for various types of transformers for the voltage distribution.

The present disclosure provides the on-load tap-changer with a clear functional structure. Moreover, various mechanisms of the on-load tap-changer are parallel arranged, and the on-load tap-changer is installed above an internal body of the transformer, which realizes the small installation space. In addition, overall aesthetics of the on-load tap-changer is realizes, and there is no need to expand the occupied space of the on-load tap-changer.

The present embodiment adopts an integrated design of the cam plate and the sheave in the on-load tap-changer, greatly reducing the number of components used in the driving mechanism that drives the vacuum tube to operate and improving operating accuracy of the on-load tap-changer. The mechanisms disposed in the same phase are evenly arranged on the two sides of the same insulation fixing plate, making the structure of the on-load tap-changer more compact and reducing the size of the on-load tap-changer.

Figure 9:
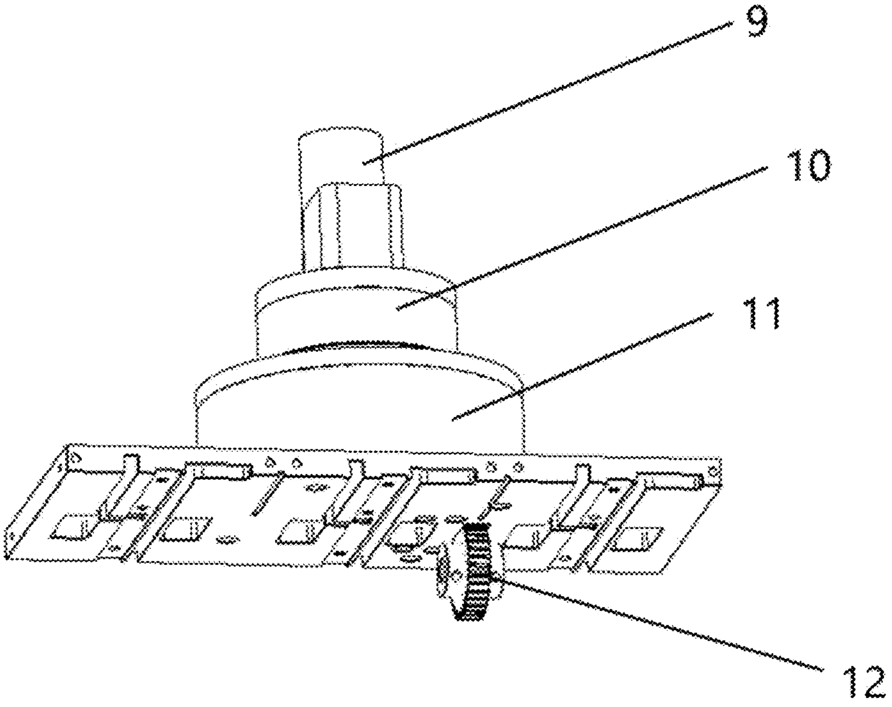
FIG. 9 illustrates a schematic three-dimensional diagram of a driving mechanism according to the present disclosure.
Figure 10:
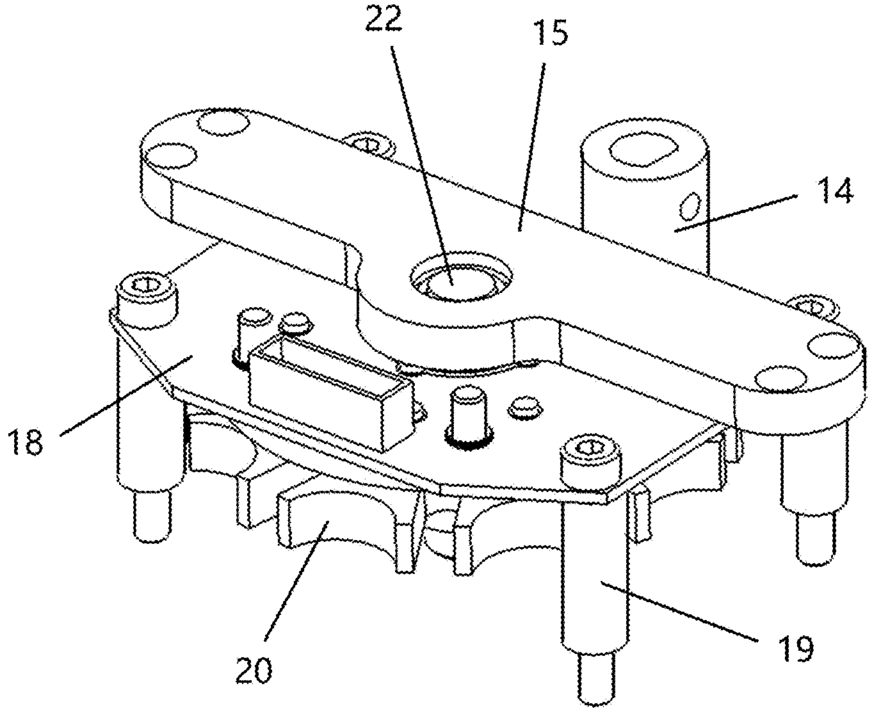
FIG. 10 illustrates a schematic three-dimensional diagram of a gear signal mechanism according to the present disclosure.
Figure 11:
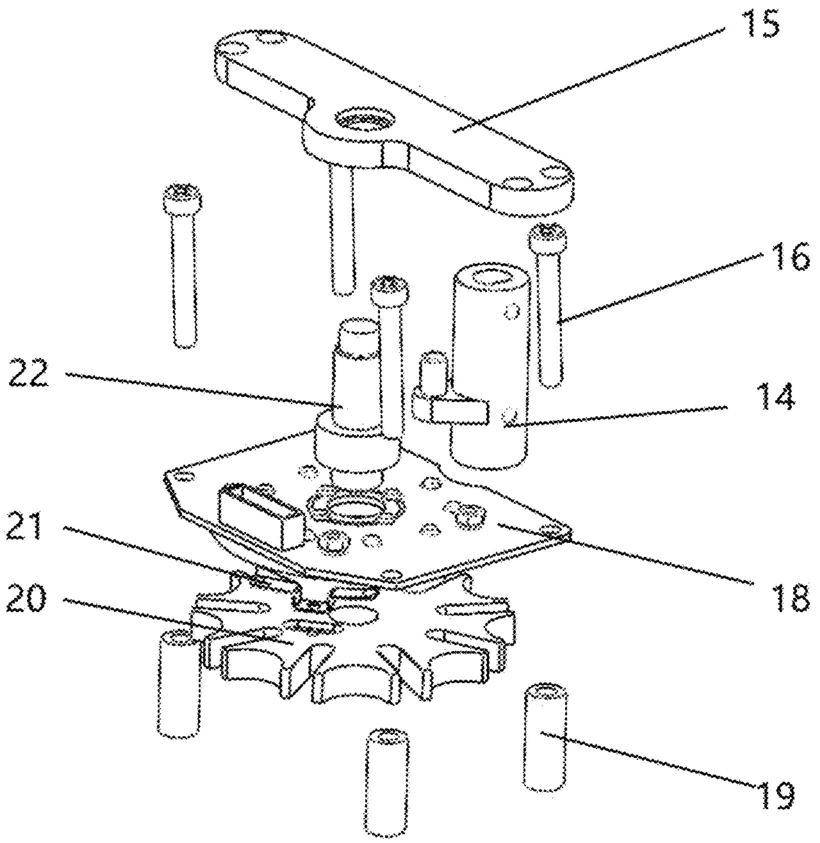
FIG. 11 illustrates a schematic explosion diagram of the gear signal mechanism according to the present disclosure.
Figure 12:
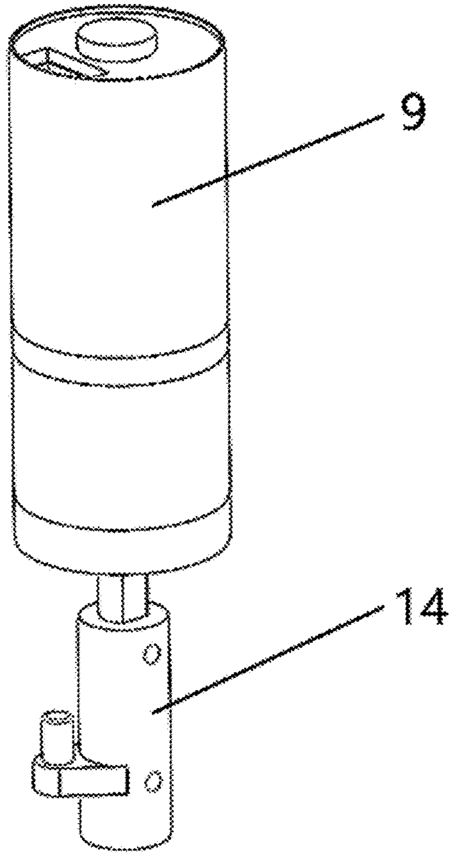
FIG. 12 illustrates a schematic diagram of an assembly of a drive motor and a gear driver according to the present disclosure.

FIG. 9 is a three-dimensional diagram of the driving mechanism of the present embodiment. The driving mechanism 1 in the above embodiment includes the drive motor 9, the gear signal mechanism 10, and the power transmission mechanism 11. Specially, FIG. 10 is a three-dimensional diagram of the gear signal mechanism of the present embodiment, and FIG. 11 is an explosion diagram of the gear signal mechanism of the present embodiment. The gear signal mechanism 10 includes an installation housing, a gear driver 14, a support plate 15, multiple studs 16, a gear signal board 18, multiple gear signal board distance sleeves 19, a gear divider 20, a gear contact piece 21, and a rotation axis 22. The drive motor 9 is fixed on the installation housing, the rotation axis 22 is set in the installation housing, and the rotation axis 22 is parallel to an axis of the drive motor 9. The support plate 15 is fixed in the installation housing, an end of the rotation axis 22 is fixedly connected to the support plate 15, and the other end of the rotation axis 22 is fixedly connected to an inner wall of the installation housing. The gear divider 20 and the gear signal board 18 are respectively sleeved on the rotation axis 22. The gear divider 20 is rotatably connected to the rotation axis 22 through bearings. The multiple gear signal board distance sleeves 19 are respectively set around the gear signal board 18. The multiple gear signal board distance sleeves 19 are parallel to the rotation axis 22, and the multiple studs 16 pass through the gear signal board 18. The multiple gear signal board distance sleeves 19 are fixedly connected to the installation housing. An inner periphery of a side of the gear signal board 18 facing towards the gear divider 20 is equipped with a metal ring, and an outer periphery of the side of the gear signal board 18 is provided with nine gear signal contacts arranged in a circumferential direction. The gear contact piece 21 is fixed along an axial direction of the gear divider 20. An end of the gear contact piece 21 is in contact with the metal ring disposed in the inner periphery of the gear signal board 18, and the other end of the gear contact piece 21 is in contact with the gear signal contact arranged in the outer periphery of the gear signal board 18. The gear driver 14 is set on an outer side of the gear signal board 18, and is parallel to the rotation axis 22. FIG. 12 is a schematic diagram of an assembly of the drive motor and the gear driver. An end of the gear driver 14 is fixedly connected to an output shaft of the drive motor 9. When the drive motor 9 runs, it drives the gear driver 14 to rotate. A side of the gear driver 14 is fixed with a plucking nail and the plucking nail is parallel to the gear driver 14. The gear divider 20 is a sheave with nine U-shaped grooves and a locking arc. The gear driver 14 uses the plucking nail to drive the gear divider 20 to rotate, and when the gear divider 20 rotates, the gear contact piece 21 is driven to rotate, thereby making the gear contact piece 21 contact with different gear signal contacts.

Figure 13:
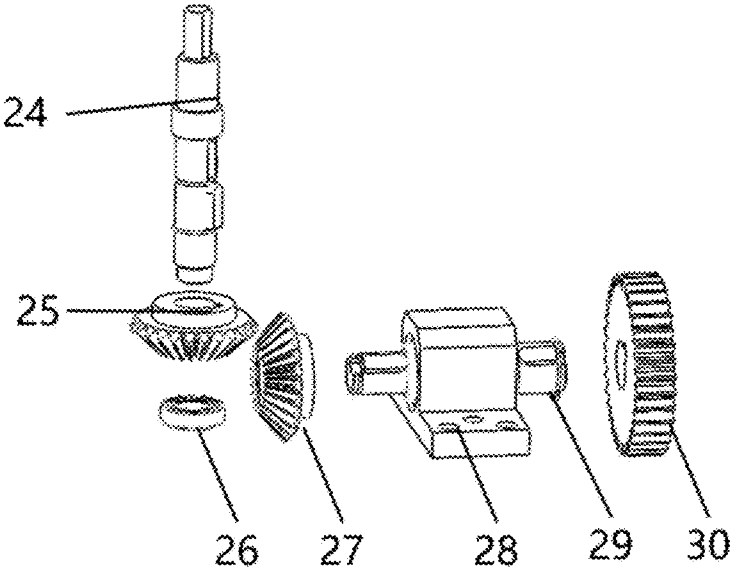
FIG. 13 illustrates a schematic explosion diagram of a power transmission mechanism according to the present disclosure.

FIG. 13 is an explosion diagram of the power transmission mechanism in the present embodiment. The power transmission mechanism 11 is located on an upper cover plate of the housing 4 and includes a drive shaft 24, a driving bevel gear 25, a driven bevel gear 27, a driven spur gear 30, a bearing seat 28, a driven shaft 29, and a bearing 26. An end of the drive shaft 24 is connected to the end of the gear driver 14 facing away from the drive motor 9. The rotation of the gear driver 14 drives the drive shaft 24 to rotate. The driving bevel gear 25 is fixed on the drive shaft 24. The driven bevel gear 27 is coaxial with the driven spur gear 30, and the driven bevel gear 27 and the driven spur gear 30 are fixed at two ends of the driven shaft 29. The driven shaft 29 is supported on the bearing seat 28 through the bearing 26, and the bearing seat 28 is fixed on the housing 4. The driving bevel gear 25 engages in the driven bevel gear 27, driving the driven bevel gear 27 and the driven shaft 29 to rotate. The driving wheel axle 58 is equipped with a transmission gear 12 and the transmission gear 12 engages in the driven spur gear 30.

In the present embodiment, the driving bevel gear 25, the driven bevel gear 27, the driven spur gear 30, and the transmission gear 12 are matched to change the transmission direction, reduce the space occupancy of the power transmission mechanism 11, and miniaturize the internal structure of the on-load tap-changer, thereby making the on-load tap-changer operate and switch more stably.

Specially, the gear driver 14 is a hollow sleeve structure with the plucking nail and used to connect the output shaft of the drive motor 9 and the drive shaft 24.

The drive motor 9 drives the driving bevel gear 25 to rotate, and then the driving bevel gear 25 drives the driven bevel gear 27 and the driven spur gear 30 to rotate. Therefore, the rotation of the driven spur gear 30 drives the transmission gear 12 and the driving cam 59 to rotate. Then, the lever 13 of the driving cam 59 rotates and drives the sheave 45 to make the moving contact 31 rotate with a fixed angle. During the above process, the cam plate 44 drives the corresponding vacuum tube 6 to perform on/off actions according to a predetermined sequence. At the same time, the pair of moving contact clamping pieces 46 cooperates with the vacuum tube 6 to switch from one fixed contact 42 to an adjacent fixed contact 42 according to the predetermined sequence when the turntable 32 rotates, thereby completing the gear switch for regulating the voltage.

The drive motor 9 drives the gear driver 14 to rotate, and the gear driver 14 drives the driving bevel gear 25, the driven bevel gear 27, and the driven spur gear 30 to rotate. Thereafter, the driven spur gear 30 drives the transmission gear 12 to rotate, thereby driving the driving wheel axle 58 to rotate. The driving wheel axle 58 drives the multiple driving cams 59 to rotate, and the multiple driving cams 59 rotate the multiple sheaves 45 to make the multiple turntables 32 rotate. The multiple turntables 32 drive the multiple moving contacts 31 and the multiple lifting levers 36 to act with the predetermined sequence and each moving contact 31 selects one of the nine fixed contacts 42 to connect. Specifically, the multiple driving cams 59 rotate the multiple cam plates 44 correspondingly to drive the multiple active levers 51 to act, which can drive the multiple follower levers 53 to act through the corresponding connecting shafts 52, and then the multiple follower levers 53 drive the multiple vacuum tubes 6 to move, thereby completing the gear switch for regulating the voltage.

The driving mechanism 1 in the present embodiment is driven by the drive motor 9, and the bevel gears facilitate the transmission, and the multiple driving cams set with the specific angle drive the corresponding turntables to rotate, thereby achieving the gear switch for regulating the voltage of the on-load tap-changer. During the gear switch for regulating the voltage of the on-load tap-changer, the gear signal board synchronously switches and displays gear information synchronously on an external controller end. The vacuum tube is a single transition resistor double vacuum tube, which achieves the vacuum arc extinction with the rotation of the corresponding insulation fixing plate during the gear switch of the on-load tap-changer.

When the on-load tap-changer in the present embodiment is in operation, the drive motor 9 rotates to drive the gear driver 14, and then the drive shaft 24 is driven to rotate by the gear driver 14. At the same time, the gear driver 14 drives the gear divider 20 to rotate through the plucking nail, and the gear contact piece 21 disposed on the gear divider 20 rotates accordingly. An end of the gear contact piece 21 slides on the inner ring of the gear signal board 18, and the other end slides between the gear signal contacts on the outer ring of the gear signal board 18, thereby achieving the gear signal switch. Thereafter, the rotation of the drive shaft 24 will drive the driving bevel gear 25 disposed thereon to rotate, further driving the driven bevel gear 27 engaged in the driving bevel gear 25 and the driven spur gear 30 disposed on the same driven shaft 29 with the driven bevel gear 27 to rotate, thereby driving the transmission gear 12 and the multiple driving cams 59 to rotate. Due to that the multiple driving cams 59 cooperate with the multiple sheave 45 on the multiple turntables 32, the multiple driving cams 59 can drive the multiple turntables 32 to rotate by using the multiple levers 13, thereby achieving the switching of the pair of moving contact clamping pieces 46 fixed on the corresponding turntable 32 from the current fixed contact 42 to the adjacent fixed contact 42 (the next one relative to the rotating direction). Due to the two driving cams 59 disposed on the two sides of the corresponding insulation fixing plate 3 being fixed at the angle of 140°, when the turntable 32 on the side of the single-phase selector system completes the gear switch, the other turntable 32 on the other side of the single-phase selector system immediately follows and enters the shifting idle time. When the multiple driving cams 59 rotate once, the three-phase selector system completes the gear switch. During the rotation of the turntable 32, it will drive the lifting lever 36 in contact with the cam plate 44 on the side of the turntable 32 to rotate around the connecting shaft 52, and at the same time, it will drive the vertical movement of the lifting shaft 62 of the vacuum tube 6 in contact with the roller 50 on the other end of the lifting lever 36. The vertical movement of the lifting shaft 62 of the vacuum tube 6 will control the separation and closure of the active end 61 of the vacuum tube 6 and the fixed end 60 of the vacuum tube 6, thereby achieving the opening and closing of the vacuum tube 6.

The above disclosed content only includes the illustrated embodiments of the present disclosure. However, the embodiments of the present disclosure are not limited to the above, and any changes that those skilled in the related art can think of should fall within the scope of the protection of the present disclosure.

What is claimed is:

1. An on-load tap-changer, comprising: a tap-changer body (2) and a driving mechanism (1) fixed on the tap-changer body (2);

wherein the tap-changer body (2) comprises:

a housing (4);

a plurality of insulation fixing plates (3), vertically fixed at a bottom of the housing (4) at equal intervals and arranged in a row;

a plurality of turntables (32), wherein each of the plurality of turntables (32) comprises: a sheave (45) and a cam plate (44), which are coaxial and integrated into one whole, the cam plate (44) is rotatably connected to a corresponding insulation fixing plate (3) of the plurality of insulation fixing plates (3), and the sheave (45) is connected to the driving mechanism (1) configured to rotate the sheave (45);

a plurality of vacuum tubes (6), fixed on the plurality of insulation fixing plates (3) correspondingly; and wherein each of the plurality of vacuum tubes (6) is disposed on a side of the corresponding insulation fixing plate (3) where the cam plate (44) is disposed; and a plurality of transmission mechanisms, wherein each of the plurality of transmission mechanisms comprises: a lifting lever (36) and a reverse spring (37), the lifting lever (36) is hinged on the corresponding insulation fixing plate (3) and is disposed between the cam plate (44) and the vacuum tube (6), an end of the lifting lever (36) is abutted against the cam plate (44) and another end of the lifting lever (36) is connected to an active end (61) of the vacuum tube (6), and the reverse spring (37) is connected between the lifting lever (36) and the housing (4) and is configured to move the active end (61) of the vacuum tube (6).

2. The on-load tap-changer according to claim 1, wherein the tap-changer body (2) further comprises: a plurality of selector systems (7);

wherein each of the plurality of selector systems (7) comprises: a moving contact (31), a plurality of fixed contacts (42) and a moving contact lead post (43), the moving contact lead post (43) is fixed on the corresponding insulation fixing plate (3) and disposed perpendicular to the corresponding insulation fixing plate (3), the moving contact lead post (43) is connected with the active end (61) of the vacuum tube (6) through a lead wire, the cam plate (44) is sleeved on the moving contact lead post (43) and rotatably connected to the moving contact lead post (43), the plurality of fixed contacts (42) are disposed around an outer side of the moving contact lead post (43) at equal intervals and are fixedly connected to the corresponding insulation fixing plate (3), the moving contact (31) is fixed on the sheave (45), an end of the moving contact (31) is connected to the moving contact lead post (43), and another end of the moving contact (31) is movably connected to the plurality of fixed contacts (42).

3. The on-load tap-changer according to claim 2, wherein the moving contact (31) comprises: a moving contact power guide seat (47), a pair of moving contact clamping pieces (46), and a pair of moving contact rotating conductive clamping pieces (48);

wherein the moving contact power guide seat (47) is fixed on the sheave (45); the sheave (45) defines a through hole along an axial direction of the sheave (45); and the through hole penetrates through the cam plate (44);

wherein the pair of moving contact clamping pieces (46) penetrates through the through hole, is abutted against an inner side and an outer side of a corresponding fixed contact (42) of the plurality of fixed contacts (42), and is connected to an end of the moving contact power guide seat (47); and wherein the pair of moving contact rotating conductive clamping pieces (48) is clamped on the moving contact lead post (43) and is connected to another end of the moving contact power guide seat (47).

4. The on-load tap-changer according to claim 3, wherein the pair of moving contact clamping pieces (46) and the pair of moving contact rotating conductive clamping pieces (48) are individually hinged with the moving contact power guide seat (47); and wherein spring shafts (49) are respectively threaded on the pair of moving contact clamping pieces (46) and the pair of moving contact rotating conductive clamping pieces (48); one of the spring shafts (49) is perpendicular to an articulated shaft disposed on the pair of moving contact clamping pieces (46), and the other of the spring shafts (49) is perpendicular to an articulated shaft disposed on the pair of moving contact rotating conductive clamping pieces (48); and the one spring shaft (49) is slidably connected to the pair of moving contact clamping pieces (46) along an axial direction of the one spring shaft (49), and the other spring shaft (49) is slidably connected to the pair of moving contact rotating conductive clamping pieces (48) along an axial direction of the other spring shaft (49); and limit springs (33) are respectively connected between two ends of the one spring shaft (49) and the pair of moving contact clamping pieces (46) as well as two ends of the other spring shaft (49) and the pair of moving contact rotating conductive clamping pieces (48).

5. The on-load tap-changer according to claim 2, wherein each of the plurality of selector systems (7) further comprises: a transition resistor mechanism (8), the transition resistor mechanism (8) comprises: a transition resistor winding plate (35) and a transition resistance (39) wound and fixed along a length direction of the transition resistor winding plate (35), and two ends of the transition resistance (39) are respectively connected to the moving contact lead post (43) and the active end (61) of the vacuum tube (6) through lead wires.

6. The on-load tap-changer according to claim 1, wherein a guide block (38) is disposed below the active end (61) of the vacuum tube (6) and is fixedly connected to the corresponding insulation fixing plate (3);

wherein the active end (61) of the vacuum tube (6) is fixedly provided with a lifting shaft (62) of the vacuum tube (6), the lifting shaft (62) of the vacuum tube (6) penetrates through the guide block (38) and is slidably connected to the guide block (38) along an axial direction of the lifting shaft (62) of the vacuum tube (6); and wherein an end of the lifting lever (36) facing away from the cam plate (44) is connected to the lifting shaft (62) of the vacuum tube (6).

7. The on-load tap-changer according to claim 6, wherein the lifting lever (36) comprises: an active lever (51) and a follower lever (53), which are integrated into one whole, an end of the active lever (51) is connected to an end of the follower lever (53); a connection between the active lever (51) and the follower lever (53) is provided with a connecting shaft (52), and the active lever (51) and the follower lever (53) are rotatably connected to the connecting shaft (52); the connecting shaft (52) is vertically fixed on the corresponding insulation fixing plate (3); and wherein another end of the active lever (51) is abutted against the cam plate (44), another end of the follower lever (53) defines a U-shaped groove, and the active end (61) of the vacuum tube (6) is embedded in the U-shaped groove; and a limited protrusion (34) is fixed between the active end (61) of the vacuum tube (6) and the lifting shaft (62) of the vacuum tube (6), and the limited protrusion (34) is abutted against the U-shaped groove.

8. The on-load tap-changer according to claim 7, wherein another end of the active lever (51) facing away from the follower lever (53) and another end of the follower lever (53) facing away from the active lever (51) are respectively provided with installation grooves; the installation grooves disposed on the follower lever (53) are located on two sides of the U-shaped groove; and the installation grooves are rotatably provided with rollers (50) respectively, and rotation shafts of the rollers (50) are parallel to the connecting shaft (52); and the rollers (50) are abutted against the cam plate (44) and the limited protrusion (34) respectively.

9. The on-load tap-changer according to claim 1, wherein the tap-changer body (2) further comprises: a driver system (5);

wherein the driver system (5) comprises: a driving wheel shaft (58), a plurality of driving cams (59), and a plurality of levers (13);

wherein the driving wheel shaft (58) penetrates through the plurality of insulation fixing plates (3) and is rotatably connected to the plurality of insulation fixing plates (3), an axis of the driving wheel shaft (58) is parallel to an axis of the cam plate (44), and the driving wheel shaft (58) is connected to an output end of the driving mechanism (1); and wherein the plurality of driving cams (59) are sleeved on the driving wheel shaft (58); and the plurality of levers (13) are respectively fixed on ends of the plurality of driving cams (59) facing away from the driving wheel shaft (58), are parallel to the driving wheel shaft (58), and are movably connected to the plurality of sheaves (45) of the plurality of turntables (32).

10. The on-load tap-changer according to claim 9, wherein two of the plurality of driving cams (59) are disposed on two sides of each of the plurality of insulation fixing plates (3) respectively, and an angle between the two driving cams (59) on the two sides of each insulation fixing plate (3) is 140 degrees (°);

wherein the two sides of each insulation fixing plate (3) are symmetrically equipped with two of the cam plates (44) of the plurality of turntables (32) and two of the sheaves (45) of the plurality of turntables (32), respectively; a plurality of fixed contacts (42) pass through the corresponding insulation fixing plate (3); and ends of two adjacent fixed contacts (42) of the plurality of fixed contacts (42) are configured to be alternately connected with a tap in a winding of an on-load transformer through lead wires.

* * * * *